(12) United States Patent
Richardson et al.

(10) Patent No.: US 8,055,778 B2
(45) Date of Patent: Nov. 8, 2011

(54) SIP USER AGENT WITH SIMULTANEOUS MULTIPLE REGISTRATIONS

(75) Inventors: David Charles Richardson, Gainesville, FL (US); Gary Edward Mora, Boca Raton, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1149 days.

(21) Appl. No.: 10/955,360

(22) Filed: Sep. 30, 2004

(65) Prior Publication Data

US 2006/0072523 A1    Apr. 6, 2006

(51) Int. Cl.
  G06F 15/16    (2006.01)
  G06F 15/177   (2006.01)
  H04J 3/16     (2006.01)
(52) U.S. Cl. ........ 709/227; 709/206; 709/221; 709/228; 370/238; 370/466
(58) Field of Classification Search ............... 709/206, 709/221, 227–228; 370/238, 466
  See application file for complete search history.

(56) References Cited

U.S. PATENT DOCUMENTS

| | | | |
|---|---|---|---|
| 2002/0114282 A1* | 8/2002 | MeLampy et al. | 370/238 |
| 2003/0137991 A1* | 7/2003 | Doshi et al. | 370/466 |
| 2004/0003046 A1* | 1/2004 | Grabelsky et al. | 709/206 |
| 2006/0020698 A1* | 1/2006 | Whipple et al. | 709/224 |
| 2008/0040461 A1* | 2/2008 | Kumbalimutt et al. | 709/221 |

FOREIGN PATENT DOCUMENTS

| | | |
|---|---|---|
| WO | WO 02/39692 A2 | 5/2002 |
| WO | WO 03/044548 A1 | 5/2003 |
| WO | WO 2004/0025915 A1 | 3/2004 |

OTHER PUBLICATIONS

Lass et al., "SIP Telephony Device Requirements, Configuration and Data", IETF Standard-Working Draft, Internet Engineering Task Force, IETF, CH, Nov. 2002, pp. 1-37.

* cited by examiner

*Primary Examiner* — Tonia L Dollinger
*Assistant Examiner* — Anish Sikri

(57) ABSTRACT

A method, device, and computer program product for Session Initiation Protocol (SIP) communications is disclosed. The method, device, and computer program product allow a SIP user agent of a SIP-enabled device to register with a plurality of SIP registrars. The plurality of SIP registration may occur simultaneously or sequentially, based on preference information for the SIP registrars.

48 Claims, 16 Drawing Sheets

Converged Network Using an Embodiment of the Present Invention

SIP Registration

Conventional Telephony Network

Converged Network

SIP Registrations in the Converged Network of FIG. 3A

Converged Network Using an Embodiment of the Present Invention

Exemplary SIP Registration Relationshiops in the Converged Network of FIG. 4A

Create SIP Identity

| Field | Value |
|---|---|
| SIP Identity Name: | Alice Local to Region A |
| Terminal Name: | alice.regionA.siemens.com |
| Terminal Number: | 1234 |
| Register by: | Terminal Number |
| SIP Routing: | Registrar |
| Registrar Address: | registrar310.siemens.com |
| Registrar Port: | 5060 |
| SIP Transport Protocol: | TLS |
| SIP Realm: | siemens.com |
| SIP User ID: | alice |
| SIP Password | ********** |

[ Save ]   [ Cancel ]

Fig. 5A
Exemplary Create SIP Identity User Interface

Create SIP Identity

| | |
|---|---|
| SIP Identity Name: | Alice Local to Region B |
| Terminal Name: | alice.regionB.siemens.com |
| Terminal Number: | 5678 |
| Register by: | Terminal Number |
| SIP Routing: | Registrar |
| Registrar Address: | registrar320.siemens.com |
| Registrar Port: | 5060 |
| SIP Transport Protocol: | TLS |
| SIP Realm: | siemens.com |
| SIP User ID: | alice |
| SIP Password | ********** |

[ Save ]  [ Cancel ]

Fig. 5B
Exemplary Create SIP Identity User Interface

Exemplary SIP Profile Manager User Interface

Edit SIP Profile: Simultaneous Registrations in Regions A,B,C,D

SIP Identities in SIP Profile:
1. Alice Local to Region A
2. Alice Local to Region B
3. Alice Local to Region C
4. Alice Local to Region D Registration Type: [ Simultaneous Registration ▾ ]

[ Save SIP Profile ]   [ Add SIP Identity ]   [ Delete SIP Identity ]   [ Edit SIP Identity ]

Fig. 5D
Exemplary Edit SIP Profile User Interface (Simultaneous SIP Registrations)

Edit SIP Profile: Preference-Based Registrations in Region A

SIP Identities in SIP Profile:      Preference:
1. Alice using Primary Registrar in Region A     1
2. Alice using Backup Registrar 1 in Region A    2
3. Alice using Backup Registrar 2 in Region A    3

Registration Type: [ Preference-Based: Upon Registration Failure ▼ ]

[ Add SIP Identity ]   [ Delete SIP Identity ]   [ Edit SIP Identity ]   [ Change Priority ]

[ Save SIP Profile ]

Fig. 5E
Exemplary Edit SIP Profile User Interface (Preference-Based SIP Registrations)

Edit SIP Profile: Manual Registration in Regions A,B,C,D

SIP Identities in SIP Profile:
1. Alice Local to Region A    Status: Registered
2. Alice Local to Region B    Attempting
3. Alice Local to Region C    Suspended
4. Alice Local to Region D    Not Registered Registration Type: [ Manual Registration ▾ ]

[ Add SIP Identity ]   [ Delete SIP Identity ]   [ Edit SIP Identity ]

[ Register ]   [ Suspend Registration ]   [ Resume Registration ]

[ Save SIP Profile ]

Fig. 5F
Exemplary Edit SIP Profile User Interface (Manual SIP Registrations)

ATTENTION: No Service Available

Unable to register with any SIP Registrar specified in the active SIP Profile:

"Priority-Based Registrations in Region A"

[ Close ]  [ Report ]

Fig. 5G
Exemplary Warning Message

Portion of an Exemplary Session Control User Interface

Portion of an Exemplary Session Control User Interface

Portion of an Exemplary Session Control User Interface

SIP USER AGENT WITH SIMULTANEOUS MULTIPLE REGISTRATIONS

FIELD OF THE INVENTION

The present invention relates generally to the Session Initiation Protocol (SIP). More particularly, the present invention relates to a method, apparatus, and computer program that allow a SIP user agent to register with multiple SIP registrars.

BACKGROUND OF THE INVENTION

In conventional circuit-switched telephony networks, such as the Public Switched Telephony System ("PSTN"), each user endpoint is connected to at most one intelligent switching point. For example, in a typical business enterprise, a business telephone is connected to exactly one Private Branch Exchange ("PBX"). A PBX is an intelligent switching point within a circuit-switched network that is responsible for routing calls to and from user endpoints or telephones that are physically connected by copper wires to the PBX. As a practical matter, since a physical connection is required between a user endpoint and an intelligent switching point, the user endpoint is only connected to at most one intelligent switching point. This requirement is a limitation of circuit-switching technology.

Newer telephony networks that employ packet-switching technologies are growing in popularity. In particular, packet-switched telephony networks that use the Internet Protocol ("IP") as a network protocol are becoming prevalent. These so-called Internet telephony networks have a potential to offer new features and services that are currently unavailable to users of circuit-switched telephony networks. Networks that employ both conventional telephony and Internet telephony are said to be converged networks.

The Session Initiation Protocol ("SIP") is one of several protocols that may be used in conjunction with the Internet Protocol to support Internet Telephony applications. The SIP specification is defined in the Internet Engineering Task Force ("IETF") Request for Comments ("RFC") 3261, dated June 2002; the disclosure of which is incorporated herein by reference in its entirety. SIP is an application-layer control protocol for creating, modifying, and terminating sessions between SIP endpoints, which are referred to as SIP user agents. A user of a SIP-enabled device can maintain a single externally visible logical identifier that is referred to as a SIP address-of-record, which allows the user to be contacted regardless of her physical network location. SIP enables a user agent to discover one or more network locations or user agents that are associated with a particular address-of-record. SIP also allows user agents to negotiate parameters that are associated with media sessions.

Typically, each SIP application user in a SIP-based network is assigned a SIP address-of-record. A SIP address-of-record is specified using a SIP Universal Resource Identifier ("URI"). The format of a SIP URI is similar to that of an email address, which typically includes a user name "at" a network domain name, for example "sip:alice@siemens.com." The SIP specification also defines a SIPS URI, for example "sips:alice@siemens.com." When a SIPS URI is used, a SIP user agent that is associated with the SIPS URI should be contacted securely, for example using the Transport Layer Security ("TLS") protocol.

The SIP specification defines several types of communication resources, which include SIP Registrars, SIP Redirect Servers, and SIP Proxy Servers. These SIP communication resources are responsible for sending, receiving, routing, and relaying SIP messages among SIP user agents, so that SIP-based sessions may be established, modified, and terminated.

SIP Proxy Servers perform a variety of functions in SIP-based networks, such as helping to route a SIP-based session invitation message to a particular SIP network user's current network location(s), authenticating and authorizing SIP user agents for particular services, implementing message-routing policies, and providing features to SIP network users.

SIP registration is a mechanism that creates a SIP address binding in a Location Service for a particular network domain. A SIP address binding associates a SIP address-of-record with one or more contact addresses. A SIP user agent can register a SIP address-of-record with a SIP Registrar to associate the SIP address-of-record with the SIP user agent's network address. SIP Registrars process SIP REGISTER request messages that are received from SIP user agents to add, remove, and query address bindings.

For example, a SIP address-of-record of "sips:alice@siemens.com" may be bound to a contact address of "sips:alice@dev101.research.siemens.com." A SIP address binding maps an incoming SIP address-of-record to one or more contact addresses. When a valid SIP REGISTER request message, which adds a SIP address binding, is received by a SIP Registrar, the SIP Registrar instructs a Location Service for a network domain to store the address binding. The Location Service allows other SIP user agents in the network domain to discover the contact address associated with the SIP address-of-record. In this regard, a SIP Registrar acts as an intelligent switching point within a packet-switched network that is responsible for routing media sessions among SIP user agents.

Prior art SIP-enabled devices have not had an ability to register with more than one SIP Registrar. As is the case with conventional telephones in a circuit-switched network, prior art SIP-enabled devices are only associated with a single intelligent switching point. In this regard, prior art SIP-enabled devices suffer from many of the same limitations of conventional telephones in circuit-switched networks.

SUMMARY AND OBJECTS OF THE INVENTION

The foregoing and other problems and deficiencies in the prior art are overcome by the present invention that provides a method, apparatus, and computer program that allow a SIP-enabled device to register with multiple SIP registrars, which are intelligent switching points within a SIP-based network.

One object of the present invention is to improve the efficiency of SIP call flows by providing for simultaneous SIP registrations with multiple SIP Registrars.

Another object of the present invention is to allow a user to store a plurality of SIP Identities, each of which contain registration information that is required by a SIP user agent to successfully register with a specified SIP Registrar.

A further object of the present invention is to allow a user to store one or more SIP Profiles, each of which refer to a plurality of SIP Identities and a manner in which a SIP user agent should register with SIP registrars that are specified in the SIP Identities.

Yet another object of the present invention is to provide a cost-effective means for a SIP user agent to register multiple SIP Identities, which may be associated with telephone numbers in the PSTN, with a plurality of SIP registrars that are local to the diverse geographical regions.

Still another object of the present invention is to provide a user interface that allows a user to manage SIP Identities and SIP Profiles.

Another object of the present invention is to provide a user interface with session control features that are not available in the prior art.

BRIEF DESCRIPTION OF THE DRAWINGS

The foregoing objects are achieved and other features and advantages of the present invention will become more apparent in light of the following detailed descriptions of exemplary embodiments thereof, as illustrated in the accompanying drawings, where:

FIG. 5A depicts an exemplary user interface of the present invention along with exemplary SIP registration information that is used to create a SIP Identity.

FIG. 5B depicts the exemplary user interface of the FIG. 5A with exemplary SIP registration information that is used to create another SIP Identity.

FIG. 5D depicts an exemplary user interface of the present invention that is used to edit an exemplary SIP Profile, which provides for simultaneous SIP registrations with multiple SIP registrars.

FIG. 5E depicts an exemplary user interface of the present invention that is used to edit an exemplary SIP profile, which provides for preference-based SIP registrations with multiple SIP registrars.

FIG. 5F depicts an exemplary user interface of the present invention that is used to edit an exemplary SIP profile and allows a user to manually control SIP registrations with multiple SIP registrars.

FIG. 5G depicts an exemplary warning message that is displayed on a user interface of the present invention.

DETAILED DESCRIPTION

SIP Registration

Figure 1:
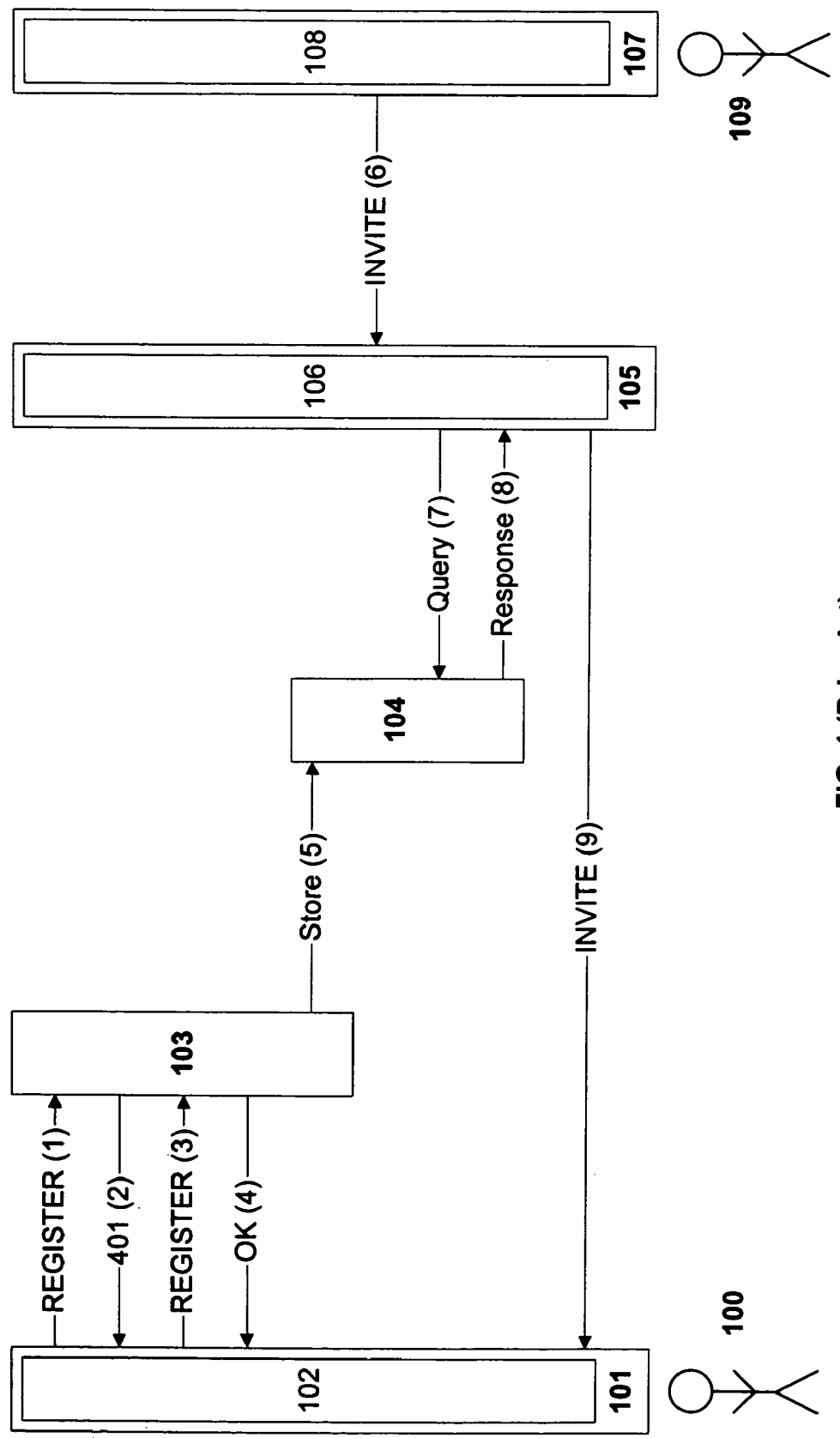
FIG. 1 depicts an exemplary prior art SIP registration.

FIG. 1 depicts an exemplary prior art SIP registration to show how SIP registration is used in a SIP-based network. A line with an arrow at one end and text in the middle represents a message. The text describes the type of message and a number in parenthesis indicates the relative ordering of the message. For example, the line with an arrow and text of "REGISTER (3)" indicates that this is a SIP REGISTER request message and that it is the third message that is transmitted in the exemplary exchange of messages.

A SIP Application User 100 has previously been assigned a SIP address-of-record, for example "sips: alice@siemens.com." Other SIP application users enter this SIP address into their SIP-enabled devices to establish SIP-based sessions with the SIP Application User 100. For example, a SIP Application User 109 may select this address from a menu list to direct his SIP-Enabled Device 107 to establish a SIP-based session with the SIP Application User 100.

However, the SIP Application User 100 is free to use a variety of SIP-enabled devices; she is not restricted to using a particular device, such as SIP-Enabled Device 101. As a result, the SIP-Enabled Device 107 does not yet have enough information to route a SIP message to SIP Application User 100, so that he may invite her to join a SIP-based session.

Suppose that the SIP Application User 100 has never used the SIP-Enabled Device 101 before, but now wishes to be contacted by other SIP application users at the SIP-Enabled Device 101. Before the SIP Application User 100 can be contacted at the SIP-Enabled Device 101, she must make other SIP-enabled devices aware that her SIP address-of-record is currently associated with the SIP-Enabled Device 101. As will be explained, SIP Registration is a necessary part of a process by which this is accomplished.

SIP-Enabled Device 101 executes a SIP User Agent 102 that processes incoming and outgoing SIP messages. The SIP registration process begins with the SIP User Agent 102 sending a SIP "REGISTER (1)" request message to a SIP Registrar 103. The SIP "REGISTER (1)" message contains, inter alia, the address-of-record for SIP Application User 100 and a contact address that is specific to the SIP-Enabled Device 101. The contact address may be specified using a fully qualified domain name or an IP address that corresponds to the SIP-Enabled Device 101.

Table 1 shows the contents of an exemplary SIP "REGISTER (1)" request message. A "Request-URI" SIP header field specifies a network domain name in which the registration is to occur. A "Via" SIP header field specifies an address where the SIP Registrar 103 should send a response to the SIP "REGISTER (1)" request message. A "To" SIP header field specifies a SIP URI for the SIP address-of-record that is being registered. A "From" SIP header field specifies a SIP URI that identifies the sender of the message. A "Call-ID" SIP header field specifies a unique identifier that is associated with the message. A "CSeq" SIP header field specifies a sequence number that is associated with the message. A "Contact" SIP header field specifies a network location where future SIP request messages should be sent. A "Content-Length" SIP header field specifies a number of octets that an optional message body contains.

TABLE 1

Exemplary SIP REGISTER Request Message

REGISTER sips:registrar.siemens.com SIP/2.0
Via: SIP/2.0/TLS device101.research.siemens.com:5060;branch=12345
Max-Forwards: 70

TABLE 1-continued

Exemplary SIP REGISTER Request Message

To: Alice <sips:alice@siemens.com>
From: Alice <sips:alice@siemens.com>;tag=678910
Call-ID: 123456789012345@siemens.com
CSeq: 1 REGISTER
Contact: <sips:alice@ device101.research.siemens.com>
Content-Length: 0

SIP registration is a very important function in SIP-based networks, which should only be done on behalf of authorized SIP-based applications users. SIP optionally provides for user authorization using Digest Authentication. Assuming that the SIP Registrar 103 requires this form of authentication, the SIP Registrar 103 responds to the SIP "REGISTER (1)" request message, which contained no "Authorization" SIP header field, with a SIP "401 (2)" message. The SIP "401 (2)" message indicates that the user is currently unauthorized. The SIP "401 (2)" contains a digest challenge, to which the SIP Registrar 103 requires a proper response before proceeding with the SIP registration process.

Assume that a network administrator (not shown) has assigned the SIP Application User 100 a SIP Identifier and a SIP Password that are valid within a particular SIP Realm. The digest challenge that is contained in the SIP "401 (2)" message identifies, inter alia, a SIP Realm and contains a "nonce" parameter. A value for the nonce parameter is uniquely generated each time the SIP Registrar 103 composes a digest challenge. The nonce value is usually constructed as a Message Digest 5 ("MD5") hash of some data, which typically includes a time-stamp and a secret phrase.

When the SIP User Agent 102 receives the SIP "401 (2)" message, it generates a response that is a function of the SIP Username and SIP Password for the specified SIP Realm and the nonce value that is contained in the SIP "401 (2)" message. The SIP User Agent 102 places the response in an "Authorization" SIP header field, which is appended to the original SIP "REGISTER (1)" request message; the result is SIP "REGISTER (3)" request message. Table 2 shows the content of an exemplary authenticated SIP "REGISTER (3)" request message.

TABLE 2

Exemplary Authenticated SIP REGISTER Request Message

REGISTER sips:registrar.siemens.com SIP/2.0
Via: SIP/2.0/TLS device101.research.siemens.com:5060;branch=12345
Max-Forwards: 70
To: Alice <sips:alice@siemens.com>
From: Alice <sips:alice@siemens.com>;tag=678910
Call-ID: 123456789012345@siemens.com
CSeq: 2 REGISTER
Contact: <sips:alice@ device101.research.siemens.com>
Authorization: Digest username="alice", realm="siemens.com"
    nonce="ea9c8e88df84f1cec4341ae6cbe5a359", opaque=" ",
    uri="sips:registrar.siemens.com",
    response="dfe56131d1958046689d83306477ecc"
Content-Length: 0

When the SIP Registrar 103 receives the SIP "REGISTER (3)" request message, it verifies the contents of the "Authorization" SIP header field. If the proper response was received, the SIP Registrar 103 sends a SIP "OK (4)" message to the SIP User Agent 102. If the proper response was not received, the SIP "OK (4)" would not be sent to User Agent 102; this is one way that the User Agent 102 may detect a failure of this registration attempt.

Assuming that the proper response was received, the SIP Registrar 103 sends a non-SIP "Store (5)" message to a Location Service 104. The non-SIP "Store (5)" message includes, inter alia, the SIP address-of-record for the SIP Application User 100, which is obtained from the "To" SIP header field of the SIP "REGISTER (3)" request message, and an address for contacting the SIP Application User 100 at the SIP-Enabled Device 101, which is obtained from the "Contact" SIP header field of the SIP "REGISTER (3)" request message. The Location Service 104 stores this information and makes it available to other SIP network elements that request it. The SIP address-of-record for SIP Application User 100 is now registered and is temporarily associated, or bound to, the network location of SIP-Enabled Device 101. If the SIP address-of-record for SIP Application User 100 is to remain associated with the SIP-Enabled Device 101, the SIP User Agent 102 must maintain the registration by periodically sending SIP REGISTER request messages to the SIP Registrar 103 before previous registrations have expired.

To understand how SIP registration information is used, assume that the SIP Application User 109 is physically located at the SIP-Enabled Device 107. The SIP-Enabled Device 107 executes a SIP User Agent 108, which is configured to use a SIP Proxy Server 105. The SIP Proxy Server 105 is executing a SIP User Agent 106 and has network connectivity to the Location Service 104 and to the SIP-Enabled Device 107.

When the SIP Application User 109 attempts to establish a SIP-based session with the SIP Application User 100, the only information that he supplies to SIP User Agent 108 is the SIP address-of-record for SIP Application User 100. The SIP User Agent 108 must discover network location(s) where invitation(s) for SIP-based sessions should be sent.

First, the SIP User Agent 108 sends a SIP "INVITE (6)" message to the SIP Proxy Server 105. The SIP "INVITE (6)" message has a "To" field which contains the SIP address-of-record for SIP Application User 100. However, the SIP Proxy Server 105 does not currently have information regarding network location(s) where a SIP message for this SIP address-of-record should be sent. Thus, the SIP Proxy Server 105 sends a non-SIP "Query(7)" message, which contains the SIP address-of-record for SIP Application User 100, to the Location Service 104.

Location Service 104 responds by sending a non-SIP "Response (8)" message to the SIP Proxy Server 105. The "Response (8)" message contains all contact address(es), in this example just one for the SIP-Enabled Device 101, that are bound to the SIP address-of-record that was provided in the non-SIP "Query(7)" message.

The SIP Proxy Server 105 now has enough information to route a SIP "INVITE(9)" message directly to the SIP User Agent 102 of SIP-Enabled Device 101. The SIP "INVITE (9)" message is the first of several SIP messages (not shown) that are required to be exchanged before an active SIP-based session (not shown) is established between the SIP User Agent 102 and SIP the SIP User Agent 108.

Conventional Telephony in a Business Enterprise

In the following exemplary scenario, assume that a business enterprise has four offices in four geographically dispersed regions in a country. Further assume that each regional office has a Private Branch Exchange ("PBX") that connects business telephones to a local exchange that is capable of connecting to customer telephones.

Figure 2:
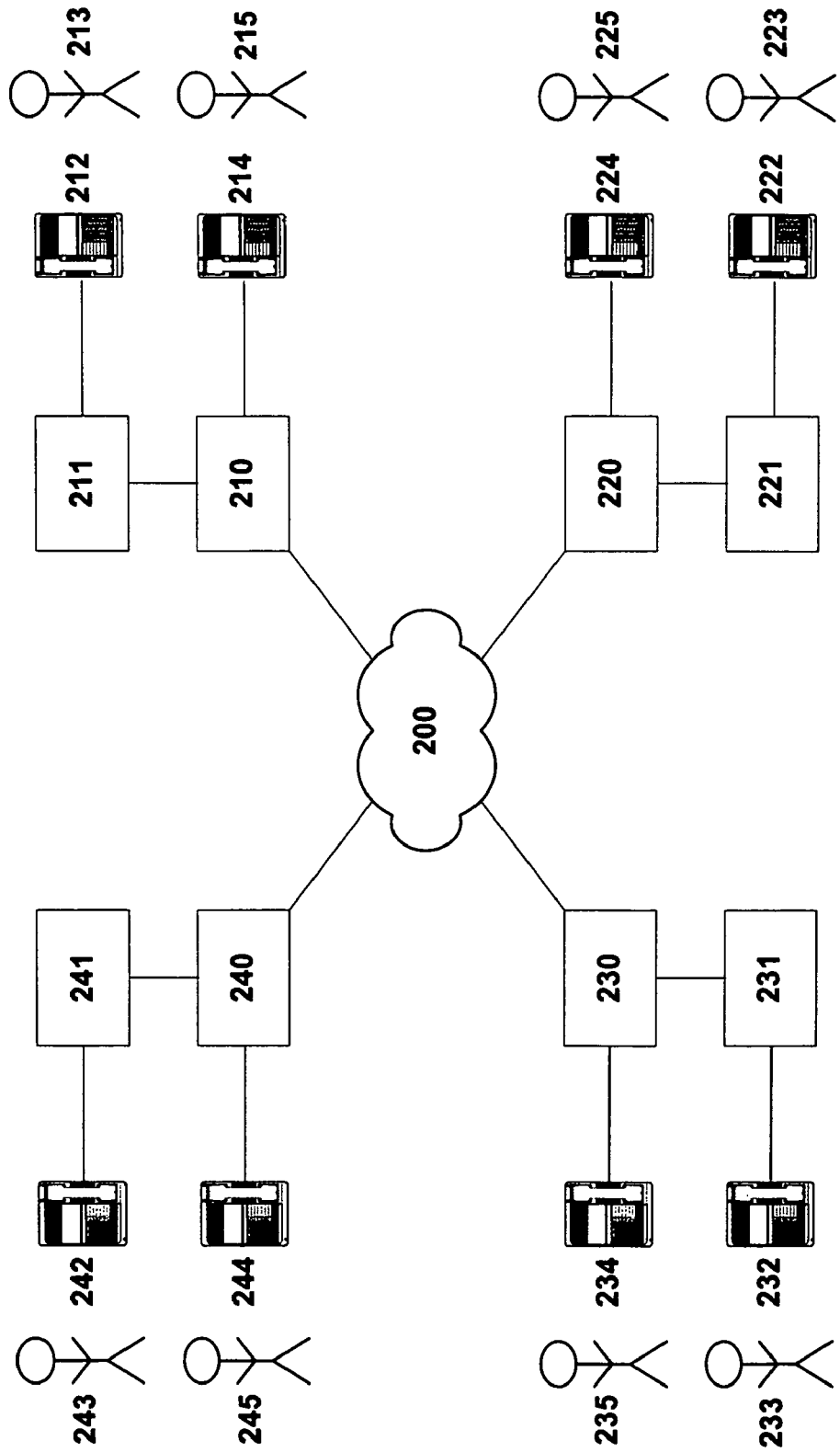
FIG. 2 depicts an exemplary prior art conventional telephony network.

Referring now to FIG. 2, a diagram of an exemplary network that supports conventional telephony in a typical business enterprise is depicted. Public Switched Telephone Network ("PSTN") 200 interconnects geographically dispersed Local Exchanges 210, 220, 230, and 240. Local Exchanges 210, 220, 230, and 240 are connected to Customer Telephones 214, 224, 234, 244, respectively. Local Exchanges 210, 220, 230, and 240 are further connected to PBX 211, 221, 231, and 241, respectively, each of which is located in one the regional offices (not shown). PBX 211, 221, 231, and 241 are connected to Business Telephones 213, 223, 233, and 243, respectively.

Suppose that a Customer 215 wishes to call one of the Business Employees 213, 223, 233, 243. The Customer 215 is likely to call Business Employee 213, because Customer Telephone 214 and Business Telephone 212 are ultimately connected to the same Local Exchange 210. Thus, there is no toll charge to Customer 215 when Customer Telephone 214 calls Business Telephone 212.

Now suppose that Business Employee 213 would like to configure the network such that Customers 225, 235, and 245 can dial a local number to reach Business Telephone 212. Business Employee 213 may instruct PBX 221, 231, and 241 to forward calls that are destined for Business Telephones 222, 232, and 242, respectively, to Business Telephone 212. After this is done, if the Customer 245 places a call to Business Telephone 242, PBX 241 routes the call through the PBX 211 to Business Telephone 212.

It should be noted that despite the fact that incoming calls are forwarded, each of the Business Telephones 212, 222, 232, and 242 remain associated with a single intelligent switching point, namely PBX 211, 221, 231, and 241, respectively. Therefore, calls directed to Business Telephone 213 must be routed by a local PBX, such as PBX 241, before being routed through PBX 210 to Business Telephone 212. A more optimal call flow would allow the PBX 241 to route the call directly to the Business Telephone 212 without going through PBX 211. However, this is not possible using a circuit-switched network, because there is no physical connection between PBX 241 and Business Telephone 212.

Prior Art SIP-Based Internet Telephony in a Business Enterprise

Figure 3A:
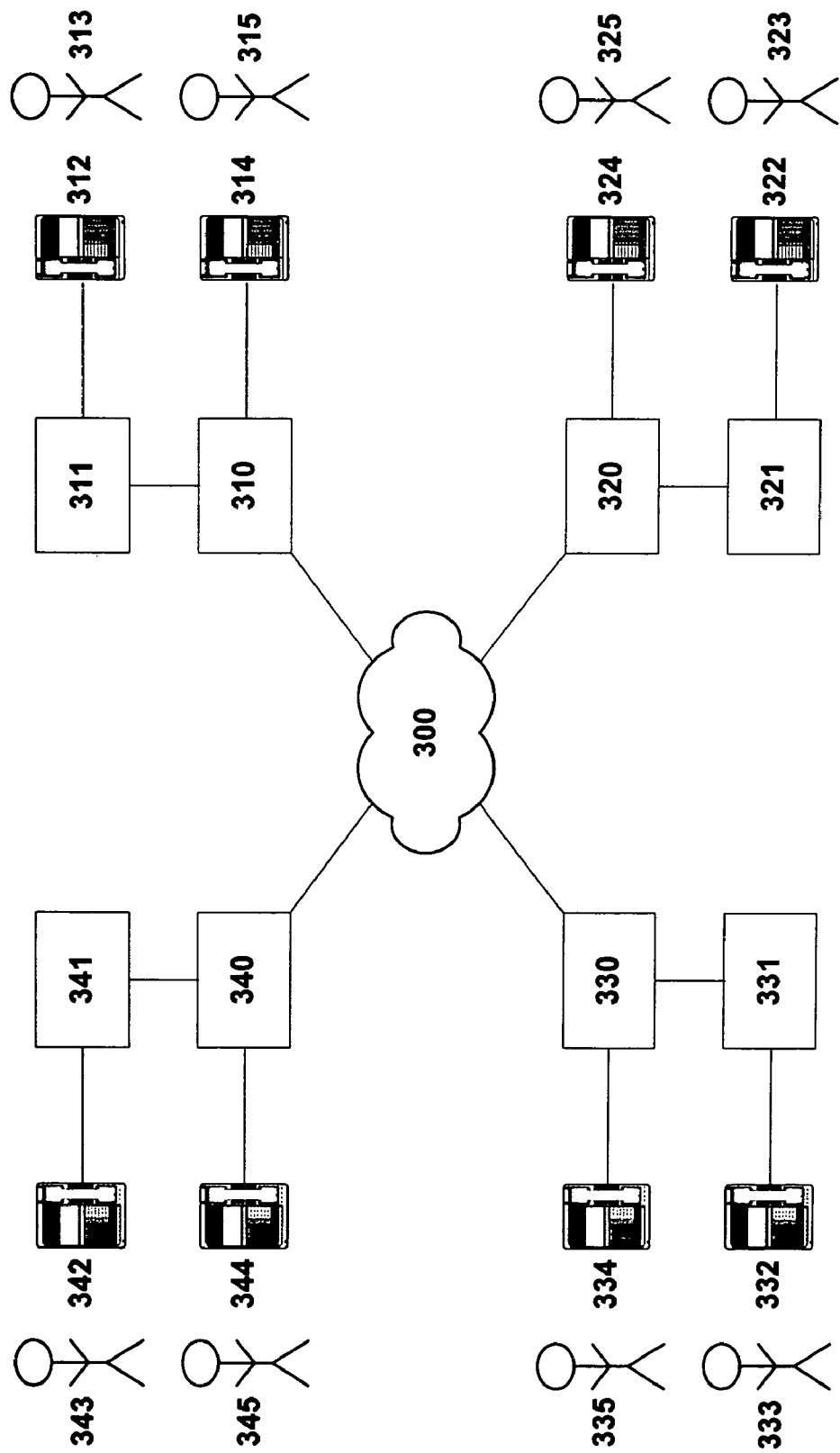
FIG. 3A depicts an exemplary prior art converged network.

Referring now to FIG. 3A, a diagram of an exemplary converged network that supports both conventional telephony and SIP-based Internet telephony in a typical business enterprise is depicted. A Corporate Network 300 is used to interconnect four SIP Registrars 310, 320, 330, and 340, which are also connected to Local Exchanges 311, 321, 331, and 341, respectively. Local Exchanges 311, 321, 331, and 341 are interconnected by the PSTN (not shown).

For illustrative simplicity, each of the four SIP Registrars 310, 320, 330, and 340 perform a variety of logical functions, but is shown as one physical device. For example, these SIP Registrars each perform the following logical functions: a SIP Registrar, a SIP Proxy Server, a SIP Redirect Server, a Location Service, a Dynamic Host Configuration Protocol server, a Simple Network Time Protocol server, a File Transfer Protocol server, a Simple Network Management Protocol server, a Messaging server, a Lightweight Directory Access Protocol server, a Domain Name server, and a gateway to one of the local exchanges.

Local Exchanges 311, 321, 331, and 341 are connected to Customer Telephones 312, 322, 332, and 342, respectively. Local Exchanges 311, 321, 331, and 341 are also connected to SIP Registrars 310, 320, 330, and 340, respectively. SIP Registrars 310, 320, 330, and 340 are connected to prior art SIP-Enabled Telephones 314, 324, 334, and 344, respectively. The prior art SIP-Enabled Telephones 314, 324, 334, and 344 are capable of registering with only one of the SIP registrars. In particular, the prior art SIP-Enabled Telephones 314, 324, 334, and 344 are registered with SIP Registrars 310, 320, 330, and 340, respectively.

Suppose that Business Employee 315 would like Customers 323, 333, and 343 each to be able to dial a local number to reach SIP-Enabled Telephone 314. Using the SIP Redirect Server functionality of the SIP Registrars 320, 330, and 340, calls for SIP-Enabled Telephones 324, 334, and 344, respectively, are redirected to SIP-Enabled Telephone 314. For example, calls for SIP-Enabled Telephone 344 may be redirected by the Redirect Server functionality of SIP Registrar 340. Now, when Customer 343 calls the SIP-Enabled Device 344, the call is delayed slightly by the non-optimal call flow of the redirection process, instead of being routed directly to the SIP-Enabled Telephone 314.

Figure 3B:
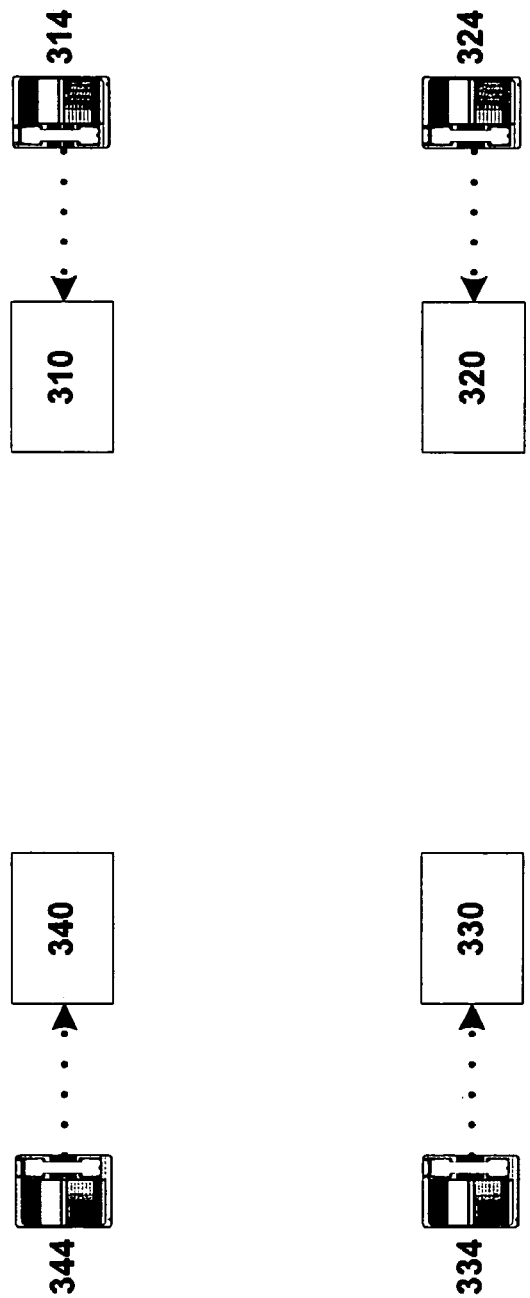
FIG. 3B depicts SIP registration relationships in the converged network of FIG. 3A.

Referring now to FIG. 3B, a subset of the network of FIG. 3A is shown. Specifically, SIP Registrars 310, 320, 330, and 340 and SIP-Enabled Telephones 314, 324, 334, and 344 are shown. A dotted line from a SIP-enabled telephone to a SIP registrar indicates that the SIP-enabled telephone is registered with the SIP registrar. As can be seen from FIG. 3B, in the prior art, each SIP-enabled telephone is registered with only one SIP registrar, which is an intelligent switching device. In this regard, the SIP-Enabled Telephones suffer from limitations that are similar to those of the conventional telephones in the network depicted in FIG. 2.

Multiple SIP-Based Registrations

The present invention provides a device, method, and computer program product that allow a SIP user agent to register SIP addresses with a plurality of SIP registrars. Thus, the present invention is able to overcome limitations in the prior art and provide a greater level of efficiency, functionality, and reliability as compared to prior art SIP-based networks.

Figure 4A:
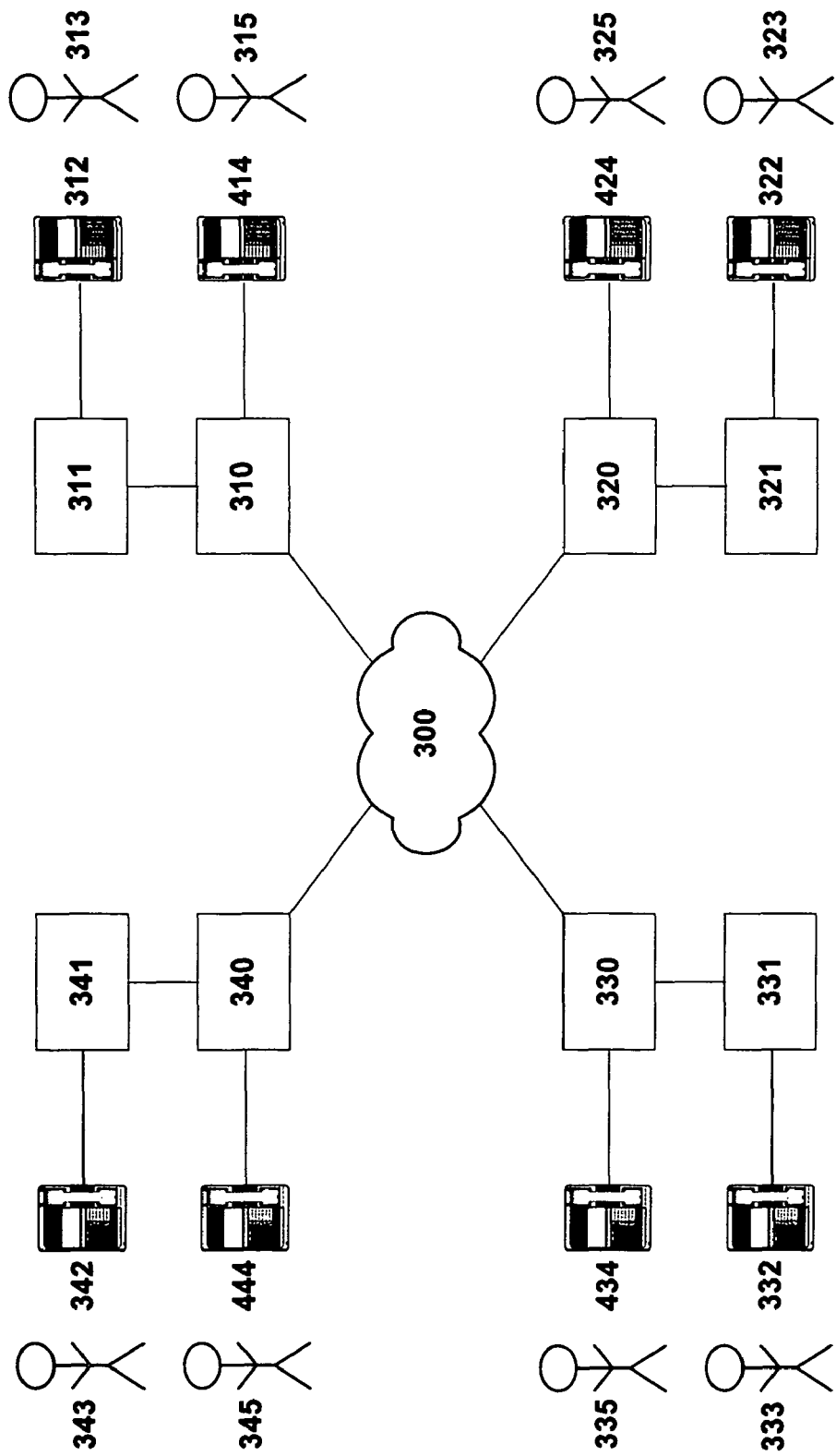
FIG. 4A depicts an exemplary converged network using an embodiment of the present invention.

Referring now to FIG. 4A, most of the prior art network of FIG. 3A is shown, however, the prior art SIP-enabled telephones have been replaced by SIP-enabled devices of the present invention. Specifically, SIP-Enabled Telephones 314, 324, 334, and 344 have been replaced by SIP-Enabled Devices 414, 424, 434, and 444, respectively. The SIP network infrastructure remains unchanged, however due to increased functionality of the SIP-enabled devices, each SIP-enabled device is capable of registering with multiple SIP registrars.

For example, suppose Business Employee 315 would like customers, who are local to each of the regional offices, to reach him by dialing a local telephone number. That is, Business Employee 315 would like Customers 313, 323, 333, and 343 to be able to dial a telephone number that is local to Local Exchanges 311, 321, 331, and 341, respectively, to establish a voice session with SIP-Enabled Device 414.

To achieve this end, the SIP-Enabled Device 414 must have enough information to successfully register with SIP Registrars 310, 320, 330, and 340. Once this information is stored on the SIP-Enabled Device 414, the Business Employee 315 can instruct the SIP-Enabled Device 414 to register with each of the Registrars 310, 320, 330, and 340. The SIP-Enabled Device 414 of the present invention can maintain simultaneous SIP registration with each of the SIP Registrars.

Figure 4B:
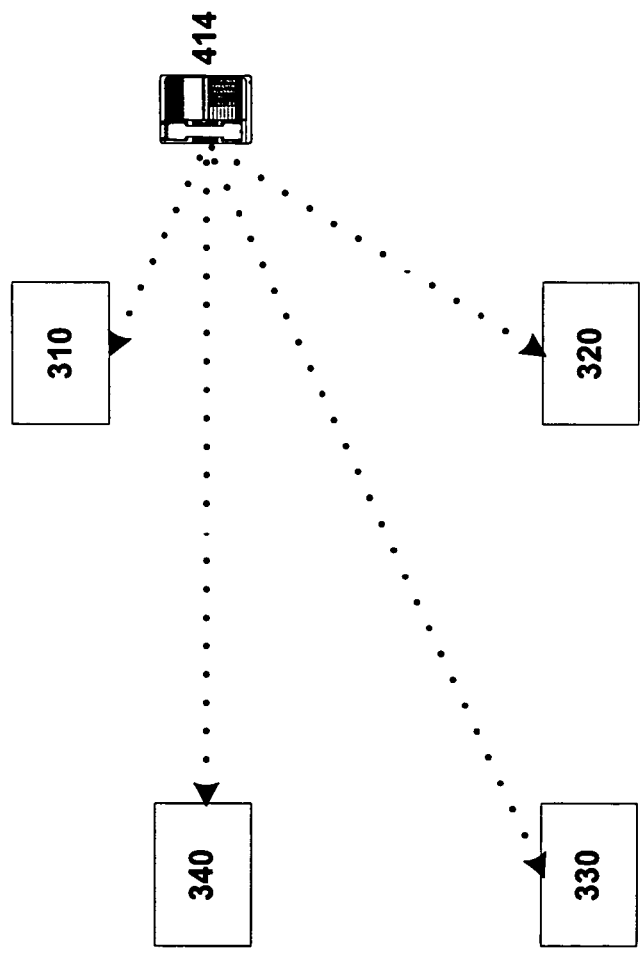
FIG. 4B depicts exemplary SIP registration relationships in the converged network of FIG. 4A using an embodiment of the present invention.

For example, assume that the SIP-Enabled Device 414 has registration information stored on it for each of the SIP Registrars 310, 320, 330, and 340 and that the SIP Application User 315 has instructed the SIP-Enabled Device 414 to simultaneously register with each. Referring now to FIG. 4B, there is shown a subset of the network of FIG. 4A. Specifically, only the SIP-Enabled Device 414 and the SIP Registrars 310, 320, 330, and 340 are shown. A dotted line from the SIP-Enabled Device 414 to a SIP registrar indicates that the SIP-Enabled Device is registered with the SIP registrar. As can be seen from FIG. 4B, the SIP-Enabled Device 414 is concurrently registered with each of the SIP Registrars 310, 320, 330, and 340.

In this example, an ability to register with multiple SIP registrars advantageously allows customers in all geographic regions to simply dial a local telephone number and become connected with the SIP-Enabled Device 414, without suffering from unnecessary delays that are associated with non-optimal call flows.

Configuring Multiple SIP-Based Registration

A discussion of configuration options of exemplary embodiments of the present invention are described below. Exemplary user interfaces are shown below as web-based interfaces. However, one skilled in the art will appreciate that a number of different types of user interfaces may be similarly employed, for example, menu-based interfaces, command line interfaces, telephone keypad driven interfaces, Java™ based interfaces, and the like. A particular type of user interface to be used depends on capabilities of a particular embodiment. The exemplary web-based user interfaces, which are described in detail below, may be accessible from a particular embodiments user interface, if for example, the embodiment is software-based and is executing on a desktop computer. In addition, a user or a system administrator may use a web browser, which may be executing on a separate computer that remotely connects to a web interface of a particular embodiment. In addition, many of these user interfaces may be executed on a separate device that creates configuration files, which can be uploaded to a computer usable or storage medium of a particular embodiment, using a disk or file transfer protocol, for example.

Referring now to FIG. 5A, an exemplary user interface of one embodiment of the present invention is shown. Each SIP-enabled device of the present invention executes a SIP user agent and has a storage medium for storing, inter alia, registration information. The exemplary user interface allows a user to name a SIP Identity, specify registration information that is required for registering with a specified SIP registrar, and store the registration information in a storage medium. A SIP user agent composes and transmits SIP REGISTER request messages to specified SIP registrars based on the registration information that is stored in a storage medium of the SIP-enabled device.

In this exemplary embodiment, a user uses the user interface to specify registration information that includes: a Terminal Name; a Terminal Number; an indicator that indicates whether the SIP user agent shall register by sending SIP REGISTER request messages based on the values of the Terminal Name or Terminal number; an address of a destination SIP registrar; a port number to use when sending SIP REGISTER request messages to the specified SIP registrar; a transport protocol to use when sending SIP REGISTER request messages to the specified SIP registrar; and authorization information. The authorization information includes: a SIP Realm, a SIP User ID, and a SIP password.

Referring once again to FIG. 4A, assume that Business Employee 315 is located in Region A, Business Employee 325 is located in Region B, Business Employee 335 is located in Region C, and Business Employee 345 is located in Region D. Further assume that Business Employee 315 has stored in a storage medium of the SIP-Enabled Device 414 the registration information that is shown in the user interface of FIG. 5A. This registration information is for a SIP Identity named "Alice Local to Region A" and is used by a SIP user agent of the SIP-Enabled Device 414 to compose and transfer SIP REGISTER request messages to the SIP Registrar 310, which is located in Region A. These SIP REGISTER request messages associate one SIP address-of-record for Business Employee 315 with the SIP-Enabled Device 414 and register the association with the SIP Registrar 310.

In this example, the user has stored a value for "Register by" that corresponds to "Terminal Number." Thus, the stored value for "Terminal Number" is mapped to a SIP address-of-record, which is associated with a contact address that is local to the SIP-Enabled Device 414, and registered with the SIP Registrar 310. The resulting SIP REGISTER request messages are encrypted and transmitted using the Transport Layer Security ("TLS") protocol to port 5060 of the SIP Registrar 310. SIP REGISTER request messages that contain SIP "Authorization" headers, uses the SIP Realm, SIP User ID, and SIP Password registration information to generate the contents of the SIP "Authorization" headers.

Referring now to FIG. 5B, another user interface that contains registration information is depicted for a SIP Identity named "Alice Local to Region B." Assume that Business Employee 315 has stored, on the storage media of the SIP-Enabled Device 414, the registration information that is depicted in the user interface of FIG. 5B. This registration information is used by the SIP user agent of the SIP-Enabled Device 414 to compose and transfer SIP REGISTER request messages to the SIP Registrar 320, which is located in Region B.

Other embodiments of the present invention have a capability of aggregating a plurality of SIP Identities in a SIP Profile. SIP Profiles can be configured in a variety of ways, each of which achieves a different SIP registration objective, as will become apparent from the examples provided below.

Figure 5C:
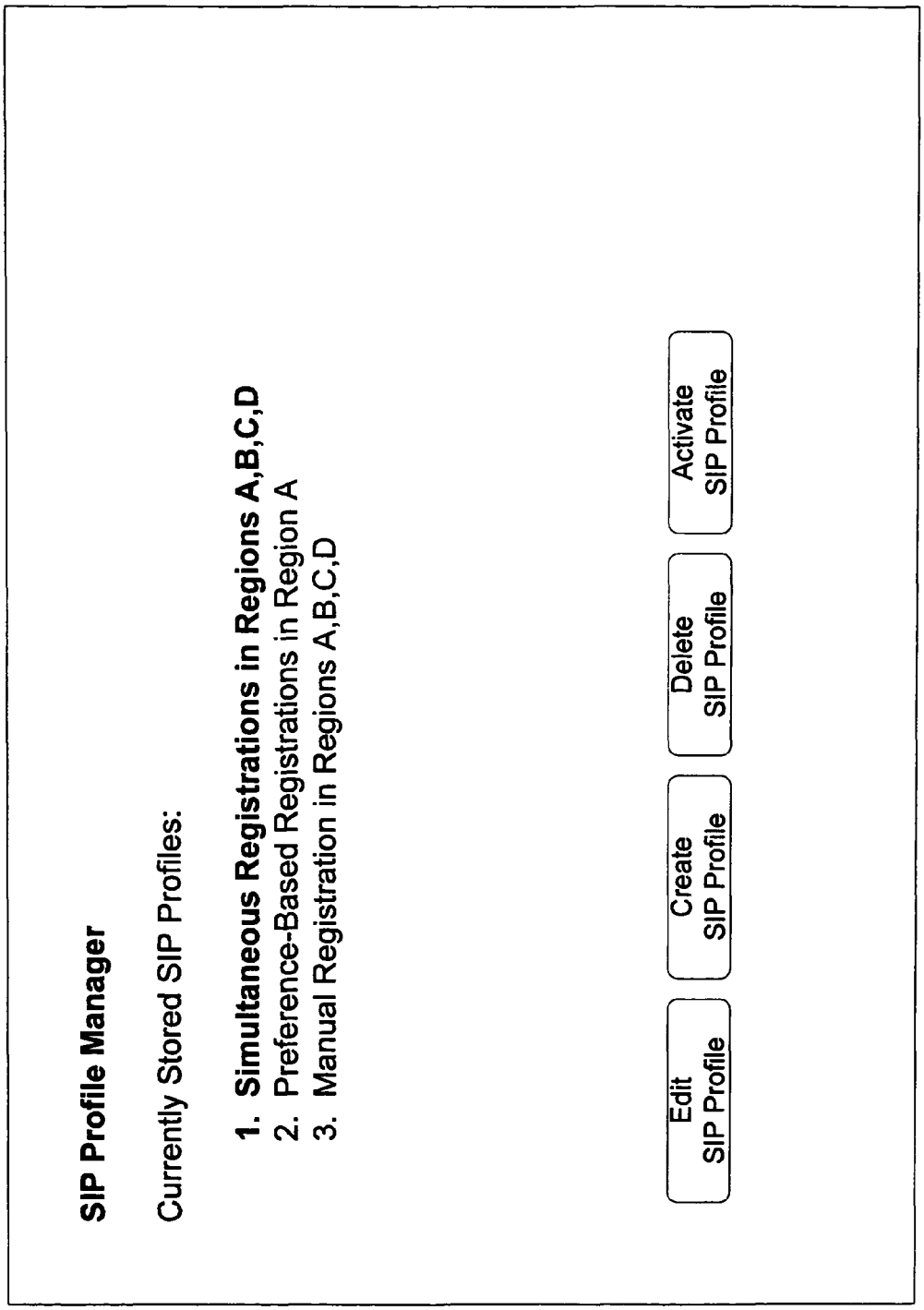
FIG. 5C depicts an exemplary user interface of the present invention that is used to manage SIP Profiles.

Referring now to FIG. 5C, an exemplary user interface of another embodiment of the present invention is shown. The user interface allows a user to configure SIP Profiles, which refer to, inter alia, a plurality of SIP Entities. Assume that the Business Employee 315 of FIG. 4A is using this embodiment as the SIP-Enabled Device 414. Further assume that three SIP Profiles, whose names are shown in FIG. 5C, are stored in the storage medium of the SIP-Enabled Device 414.

As shown in FIG. 5C, the first stored SIP Profile is named "Simultaneous Registrations in Regions A, B, C, D." Assume that a user has selected this SIP Profile and then clicked the "Edit SIP Profile" button. FIG. 5D shows the resulting screen that is displayed on the user interface of the SIP-Enabled Device 414. This profile refers to four SIP Identities, each of which contains registration information that is used to register with one of the SIP Registrars in a different one of the regions that were described in connection with FIG. 4A.

For example, the SIP Identities that are depicted in the user interfaces of FIGS. 5A and 5B are referred to in this SIP Profile, namely "Alice Local to Region A" and "Alice Local to Region B." That is, these SIP Identities are used by the SIP user agent of the SIP-Enabled Device 414 to compose SIP REGISTER request messages that are used to register with SIP Registrars 310 and 320, respectively. Additionally, there are two other SIP Identities, the contents of which are not shown, that have been named "Alice Local to Region C" and "Alice Local to Region D." These SIP Identities are used to register with SIP Registrars 330 and 340, respectively.

As shown in FIG. 5D, a user has selected "Simultaneous Registration" from a pull-down list that sets a value for a "Registration Type" parameter of the SIP Profile. Assume that the user has selected the "Save SIP Profile" button to save the attributes of the SIP Profile as shown. The user may activate this SIP Profile, for example, by using the user interface depicted in FIG. 5C to select the name of this SIP Profile and then clicking on "Activate SIP Profile" button.

When the user activates this SIP Profile, the SIP user agent of the SIP-Enabled Device 414 reads data stored in the storage medium of the SIP-Enabled Device 414, which is associated with the active SIP Profile. These data include the SIP Identities specified in the active SIP Profile, which are used to composes SIP REGISTER request messages. The SIP user agent also reads a value associated with the "Registration Type" parameter of the SIP Profile, which has been set to "Simultaneous Registration." This is a type of preference information, which indicates that it is preferable to simultaneously register with all SIP registrars that are specified in the SIP identities. Based on this value, the SIP user agent sends SIP REGISTER request messages to each of the SIP Registrars specified in each of the SIP Identities of the active SIP Profile to maintain simultaneous registrations.

Assume that the information contained in the SIP Identities is valid and sufficient for successful SIP registrations with each of the specified SIP Registrars. The result is that the SIP user agent of the SIP-Enabled device 414 has registered a different SIP address binding with each of the specified SIP Registrars. That is, the SIP user agent of the SIP-Enabled Device 414 is now simultaneously registered with four SIP Registrars. These simultaneous registration relationships are the same as those depicted in FIG. 4B.

Another embodiment of the present invention stores a plurality of SIP Identities and one or more SIP Profile. Each SIP Profile refers to a plurality of the stored SIP Identities and sets conditions for registering with SIP Registrars that are specified in the SIP Identities that are referred by the SIP Profile. For example, a user may be presented with the exemplary user interface depicted in FIG. 5E. The user is able to set and store a priority value for each SIP Identity referred to in the SIP Profile. The user is also able to specify a "Registration Type" parameter of the SIP Profile, which is used by the SIP user agent to determine how the SIP registrations are to be accomplished.

For example, the user may select "Preference-Based: Upon Registration Failure" from a list to set a value for the Registration Type parameter. In this case, when the user activates the SIP Profile, the SIP user agent will process the preference information for the SIP Identities that are referred to in the active SIP Profile to generate a preferred order of registration. The SIP user agent will attempt to register with the SIP Registrars, that are specified in the SIP Identities, according to the preferred order of registration.

The SIP user agent first attempts to register using information stored in the SIP Identity that is most preferred according to the preferred order of registration, which in this case is the SIP Identity named "Alice using Primary Registrar in Region A." If the SIP user agent fails to successfully register with the specified SIP Registrar, the SIP user agent then attempts to register using information contained in the next most preferred SIP Identify, which in this case is "Alice using Backup Registrar 1 in Region A." If the SIP user agent fails to register with this specified SIP Registrar, the SIP user agent then attempts to register using information contained in the next most preferred SIP Identify, which in this case is "Alice using Backup Registrar 2 in Region A." If the SIP user agent is unable to register with any of the SIP registrars that are specified by the SIP Identities of the active SIP Profile, the user agent may alert the user or a system administrator. For example, the user agent may cause the message that is depicted in FIG. 5G, to appear on the user interface. This message indicates that no service is available from any of the SIP Registrars that are specified in the SIP Identities that are referred to by the active SIP Profile.

There are several other preference-based registration schemes that may be employed in a SIP-Enabled Device of the present invention. For example, a user may set a value of "Preference-Based: Upon Loss of Registration" for the Preference Type of a SIP Profile. This type of registration is very similar to the example just described, as the SIP user agent will process preference values that are associated with SIP Identities referred to in the active SIP profile to determine a preferred order of registration. The SIP user agent first attempts to register using the most preferred SIP Identity. Assume that this is a successful registration. In this case, the SIP user agent will attempt to register with the SIP registrar that is specified by the next most preferred SIP Identity, according to the preferred order of registration, upon a loss of the previously successful registration.

Another preference-based SIP registration scheme of a SIP-Enabled Device of the present invention is to allow a SIP user agent to create a preferred order of registration that is based on historical information. The SIP user agent may calculate and store metrics about each SIP Identity to generate historical information. For example, the user agent may store for each SIP Identity referred to by a SIP Profile, values for a number of successful SIP registrations and a number of SIP registration attempts. In this example, the SIP user agent creates a preferred order of registration based on these values. That is, the SIP Identity with the highest ratio of successful SIP registrations to SIP registration attempts become the most preferred, and so on.

Another embodiment of a SIP-enabled device of the present invention allows a user to manually control SIP registrations with SIP registrars that are specified in SIP Identities. Referring now to FIG. 5F, an exemplary user interface is shown that contains representations of four SIP Identities. As indicated by the text in the "Status" column of the user interface of FIG. 5F, the SIP-enabled device is currently not registered with the SIP registrar that is referred to in the SIP Identity labeled as "Alice Local to Region D." A user (not shown) is able to select this representation and also select a representation that is labeled "Register." These selections result in the SIP-enabled device attempting to register with the SIP Registrar that is specified in the selected SIP Identity. The user is also able to suspend and resume SIP registrations using a similar selection process.

Using Multiple SIP-Based Registration

Another embodiment of a SIP-enabled device of the present invention has the ability to simultaneously register with multiple SIP registrars, as has previously been explained, and additionally has an ability to present selectable representations of currently active SIP-based sessions on a user interface. Assume that a storage medium of this embodiment has an active SIP Profile stored in it that corresponds to the SIP Profile depicted in the user interface of FIG. 5D. Further assume that this embodiment is used in the network depicted in FIG. 4A as SIP-Enabled Device 414, and that all registration attempts have been successful.

Figure 6A:
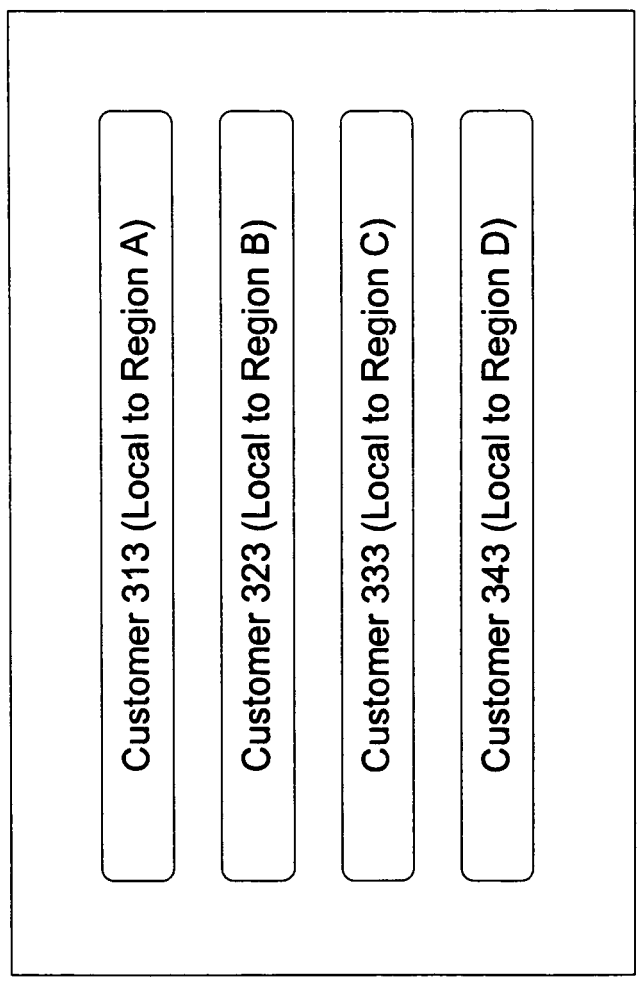
FIG. 6A depicts a portion of an exemplary session control user interface of the present invention, which allows a user to select an active SIP-based session, such that the selection results in the user actively participating the selected SIP-based session.

Referring now to FIG. 6A, a portion of an exemplary user interface of this embodiment of the present invention is shown. As can be seen, a user is presented with four selectable representations, each of which corresponds to a current voice session with a customer from each of the previously discussed geographically dispersed regions. When the user selects one of these representations, she is able to participate in a voice session with the customer identified by the selectable representation. For example, if the user selects the representation labeled "Customer 343 (Local to Region D)" she participates in a voice session with the Customer 343. These selectable representations are analogous to "line appearances" of telephones that are a part of conventional telephony networks. However, all line appearances of conventional telephones are serviced by a single intelligent switching point, more particularly a single PBX, while the voice sessions that are associated with the selectable representations of this embodiment may be associated with multiple intelligent switching points, more particularly multiple SIP registrars.

Figure 6B:
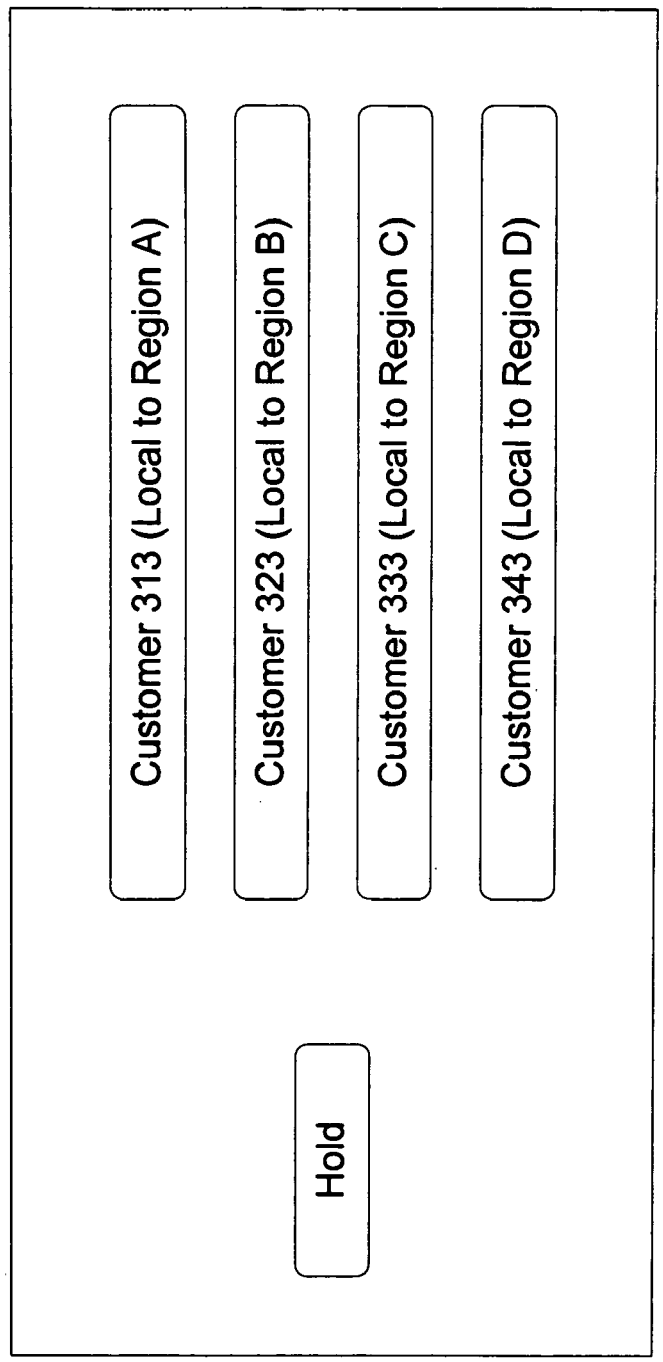
FIG. 6B depicts a portion of an exemplary session control user interface of the present invention, which allows a user to select an active SIP-based session, such that the selection results in a hold function being applied to the selected SIP-based session.

Another embodiment of the present invention builds on the functionality of the previously described embodiment. This embodiment allows a user to select a selectable representation of an active session and also select a representation of a function to be applied to the selected representation of the active session. Referring now to FIG. 6B, a portion of a user interface of this embodiment of the present invention is shown. The user of this SIP-enabled device is able to select a representation of an active voice session, such as "Customer 333 (Local to Region C)" and select the representation of the function labeled "Hold." These selections have the practical effect of placing the selected voice session on hold.

Figure 6C:
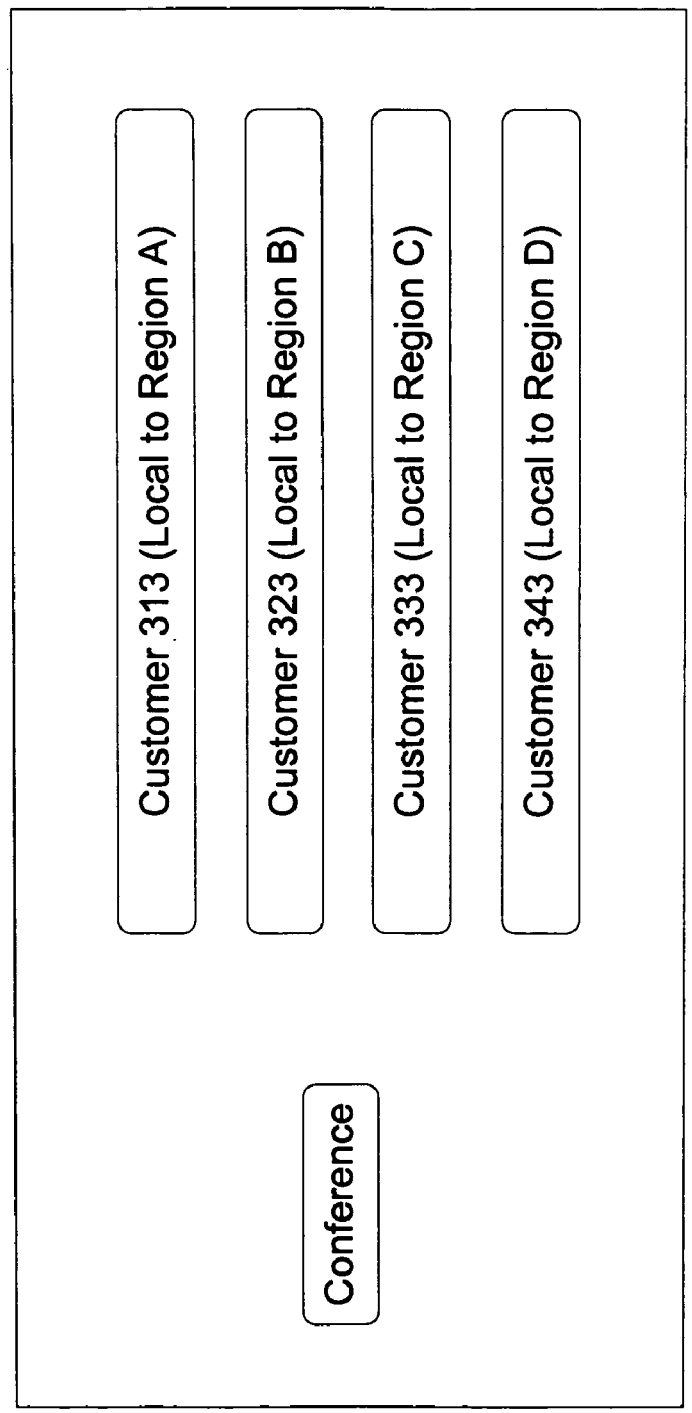
FIG. 6C depicts a portion of an exemplary session control user interface of the present invention, which allows a user to select a plurality of active SIP-based sessions, such that the selections results in the user agent conferring the selected SIP-based sessions, which effectively achieves a conference call that includes the selected SIP-based sessions.

Another embodiment of the present invention builds on the functionality of the previously described embodiment. This embodiment allows a user to select multiple selectable representations of active sessions and also select a representation of a function to be applied to the active sessions of the selected representations. Referring now to FIG. 6C, a portion of a user interface of this embodiment of the present invention is shown. The user of this SIP-Enabled Device is able to select representations of active voice sessions, such as "Customer 333 (Local to Region C)" and "Customer 343 (Local to Region D)" and select the representation of the function labeled "Conference." These selections have the practical effect of placing the user in a conference call type session with the selected voice sessions.

One skilled in the art will appreciate that many changes can be made to the exemplary embodiments disclosed without departing from the spirit of the present invention.

We claim:

1. A Session Initiation Protocol (SIP) enabled device comprising:
   an SIP user agent;
   a non-transitory storage medium that stores a plurality of SIP identities and at least one SIP profile; and
   a user interface;
   wherein each SIP identity contains registration information for registering said SIP enabled device with a SIP registrar for a particular one of a plurality of network domains, said SIP user agent selectively registering SIP addresses with a selected one or more SIP registrars,
   wherein communications to said SIP enabled device originating local to each of said plurality of network domains are routed directly to said SIP enabled device as local communications, and wherein the user interface displays a selectable representation of each stored SIP profile.

2. A Session Initiation Protocol (SIP) enabled device according to claim 1, wherein:
   the SIP user agent receives said registration information, which is contained in a plurality of the stored SIP identities; and
   wherein the SIP user agent maintains simultaneous SIP registrations with multiple SIP registrars, which are specified in the received registration information for simultaneous registration.

3. A Session Initiation Protocol (SIP) enabled device according to claim 1, wherein the SIP enabled device is a SIP communications device;
   wherein each SIP profile refers to a plurality of the stored SIP identities, and
   wherein each SIP profile additionally contains preference information for the plurality of SIP identities that are referred to therein.

4. A Session Initiation Protocol (SIP) enabled device according to claim 1, further comprising:
   an administration interface, wherein the administration interface receives a remotely configured SIP profile referring to a plurality of the SIP identities and which is subsequently stores received SIP profiles in the storage medium, the SIP user agent having registered a different SIP address with each registered SIP registrar.

5. A SIP communications device according to claim 3, wherein a selection of one of the selectable representations causes the SIP user agent to receive the contents of the selected SIP profile, which is represented by the selected representation; and
   wherein the SIP user agent attempts to maintain simultaneous SIP registrations with each of the SIP registrars, which are specified in the SIP identities to which the selected SIP profile refers for simultaneous registration.

6. A SIP communications device according to claim 3, wherein the user interface displays a selectable representation of each stored SIP profile;
   wherein a selection of one of the selectable representations causes the SIP user agent to receive the contents of the selected SIP profile, which is represented by the selected representation;
   wherein the SIP user agent processes the received contents of the selected SIP profile creating a preferred order of registration, wherein the preferred order of registration identifies a most preferred SIP registrar and a next most preferred SIP registrar;
   wherein the SIP user agent attempts to register with the most preferred SIP registrar; and wherein a failure to register with the most preferred SIP registrar causes the SIP user agent to attempt to register with the next most preferred SIP registrar.

7. A SIP communications device according to claim 3,
   wherein a selection of one of the selectable representations causes the SIP user agent to receive the contents of the selected SIP profile, which is represented by the selected representation;
   wherein the SIP user agent processes the received contents of the selected SIP profile creating a preferred order of registration;
   wherein the preferred order of registration identifies a most preferred SIP registrar and a next most preferred SIP registrar;
   wherein the SIP user agent attempts to register with the most preferred SIP registrar; and wherein a loss of registration with the most preferred SIP registrar causes the SIP user agent to attempt to register with the next most preferred SIP registrar.

8. A SIP communications device according to claim 5, wherein:
   the SIP user agent causes a message to be displayed on the user interface if none of the registration attempts result in a successful SIP registration.

9. A SIP communications device according to claim 6, wherein:
   the SIP user agent causes a message to be displayed on the user interface if none of the registration attempts result in a successful SIP registration.

10. A Session Initiation Protocol (SIP) enabled device according to claim 2, wherein the user interface displays a plurality of selectable line appearance representations, wherein each selectable line appearance representation corresponds to an active SIP-based session in which the SIP-enabled device is currently participating;

wherein a selection of one of the selectable line appearance representations causes the SIP-enabled device to send session data in the active SIP-based session that corresponds to the selected line appearance representation.

11. A Session Initiation Protocol (SIP) enabled device according to claim 2, further comprising:

wherein the user interface displays two or more selectable line appearance representations, wherein each selectable line appearance representation corresponds to an active SIP-based session in which the SIP-enabled device is currently participating;

wherein the user interface also displays a selectable function representation, which is associated with a session control function;

wherein a selection of the function representation and one or more of the line appearance representations, causes the session control function to be applied to the one or more active SIP-based sessions, which correspond to the one or more selected line appearance representations.

12. A Session Initiation Protocol (SIP) enabled device according to claim 11, wherein:

the session control function that is associated with the selectable function representation is a session holding function.

13. A Session Initiation Protocol (SIP) enabled device according to claim 11, wherein:

the session control function that is associated with the selectable function representation is a session conferencing function.

14. A SIP communications device according to claim 6, wherein:

the preference information of at least one of the at least one SIP profile is based on historical performance data.

15. A SIP communications device according to claim 7, wherein:

the preference information of at least one of the at least one SIP profile is based on historical performance data.

16. A computer program product comprising a non-transitory computer usable medium having computer readable program code stored thereon and configured to:

execute in a Session Initiation Protocol (SIP) enabled device;

communicate in SIP-based communications using a SIP user agent; and control communications between the SIP user agent and a storage medium of the SIP-enabled device, wherein the storage medium stores a plurality of SIP identities, wherein each SIP identity contains registration information for registering a SIP enabled device with a SIP registrar for a particular one of a plurality of network domains, and said SIP user agent selectively registers SIP addresses with one or more SIP registrars, wherein communications to said SIP enabled device originating local to each of said plurality of network domains are routed directly to said SIP enabled device as local communications.

17. A computer program product according to claim 16, wherein the computer readable program code is further configured to execute in the SIP-enabled device such that:

the SIP user agent receives from the storage medium registration information that is contained in a plurality of the stored SIP identities; and the SIP user agent maintains simultaneous SIP registrations with the SIP registrars that are specified in the received registration information for simultaneous registration.

18. A computer program product according to claim 16, wherein the computer readable program code is further configured to execute in the SIP-enabled device such that:

the SIP user agent receives from the storage medium data contained in at least one SIP profile, wherein each stored SIP profile refers to a plurality of stored SIP identities and contains preference information for the plurality of SIP identities that are referred to therein.

19. A computer program product according to claim 16, wherein the computer readable program code is further configured:

to control an administration interface of the SIP-enabled device, wherein the administration interface receives a remotely configured SIP profile referring-to a plurality of the SIP identities and subsequently stores received SIP profiles in the storage medium, the SIP user agent having registered a different SIP address with each registered SIP registrar.

20. A computer program product according to claim 18, wherein the computer readable program code is further configured:

to control a user interface of the SIP-enabled device, wherein the user interface displays a selectable representation of each stored SIP profile;

wherein a selection of one of the selectable representations causes the SIP user agent to receive the contents of the selected SIP profile, which is represented by the selected representation, from the storage medium; and wherein the SIP user agent is capable maintaining simultaneous SIP registrations with the SIP registrars, which are specified in the plurality of stored SIP identities to which the selected SIP profile refers for simultaneous registration.

21. A computer program product according to claim 18, wherein the computer readable program code is further configured:

to control a user interface on the S1P-enabled device, wherein the user interface displays a selectable representation of each stored SIP profile;

wherein a selection of one of the selectable representations causes the SIP user agent to receive the contents of the selected SIP profile, which is represented by the selected representation, wherein the SIP user agent processes the received contents of the selected SIP profile creating a preferred order of registration, wherein the preferred order of registration identifies a most preferred SIP registrar and a next most preferred SIP registrar;

wherein the SIP user agent attempts to register with the most preferred SIP registrar; and wherein a failure to register with the most preferred SIP registrar causes the SIP user agent to attempt to register with the next most preferred SIP registrar.

22. A computer program product according to claim 18, wherein the computer readable program code is further configured:

to control a user interface of the SIP-enabled device, wherein the user interface displays a selectable representation of each stored SIP profile;

wherein a selection of one of the selectable representations causes the SIP user agent to receive the contents of the selected S1P profile, which is represented by the selected representation;

wherein the SIP user agent processes the received contents of the selected SIP profile creating a preferred order of registration, wherein the preferred order of registration identifies a most preferred SIP registrar and a next most preferred SIP registrar;

wherein the SIP user attempts to register with the most preferred SIP registrar; and wherein a loss of registration with the most preferred SIP registrar causes the SIP user agent to attempt to register with the next most preferred SIP registrar.

23. A computer program product according to claim 20, wherein the computer readable program code is further configured to execute in the SIP-enabled device such that:

the SIP user agent causes a message to be displayed on the user interface if none of the registration attempts result in a successful SIP registration.

24. A computer program product according to claim 21, wherein the computer readable program code is further configured to execute in the SIP-enabled device such that:

the SIP user agent causes a message to be displayed on the user interface if none of the registration attempts result in a successful SIP registration.

25. A computer program product according to claim 17, wherein the computer readable program code is further configured:

to control a user interface of the SIP-enabled device, wherein the user interface displays a plurality of selectable line appearance representations, wherein each selectable line appearance representation corresponds to an active S1P-based session in which the SIP-enabled device is currently participating;

wherein a selection of one of the selectable line appearance representations causes the SIP-enabled device to send session data in the active SIP-based session that corresponds to the selected line appearance representation.

26. A computer program product according to claim 17, wherein the computer readable program code is further configured:

to control a user interface of the SIP-enabled device, wherein the user interface displays a plurality of selectable line appearance representations, wherein each selectable line appearance representation corresponds to an active SIP-based session in which the SIP-enabled device is currently participating;

wherein the user interface also displays a selectable function representation, which is associated with a session control function;

wherein a selection of the function representation and one or more of the line appearance representations, causes the session control function to be applied to the one or more active session, which corresponds to the one or more selected line appearance representations.

27. A computer program product according to claim 26, wherein the session control function that is associated with the selectable function representation is a session holding function.

28. A computer program product according to claim 26, wherein the session control function that is associated with the selectable function representation is a session conferencing function.

29. A computer program product according to claim 21, wherein the preference information of at least one stored SIP profile is based on historical performance data.

30. A computer program product according to claim 22, wherein the preference information of at least one stored SIP profile is based on historical performance data.

31. A method for Session Initiation Protocol (SIP) based communications comprising:

providing a SIP-enabled device having a storage medium and a SIP user agent, wherein the storage medium stores a plurality of SIP identities, wherein each SIP identity contains registration information for registering said SIP enabled device with a SIP registrar for a particular one of a plurality of network domains, and wherein the SIP user agent received information from the storage medium;

receiving from the storage medium the registration information contained in one or more of the stored SIP identities; and maintaining one or more SIP registrations with one or more of the SIP registrars that are specified in the received registration information, wherein communications to said SIP enabled device originating local to each of said plurality of network domains are routed directly to said SIP enabled device as local communications.

32. A method for Session Initiation Protocol (SIP) based communications according to claim 31, wherein the SIP enabled device is a SIP communications device; and the step of attempting to maintain one or more SIP registrations with one or more of the SIP registrars that are specified in the received registration information includes the SIP user agent attempting to maintain simultaneous SIP registrations with a plurality of SIP registrars that are specified in the received registration information for simultaneous registration.

33. A method for Session Initiation Protocol (SIP) based communications according to claim 31, wherein the SIP-enabled device is a SIP communications device, said method further comprising:

storing at least one SIP profile in the storage medium, wherein each SIP profile refers to a plurality of the stored SIP identities, and wherein each SIP profile contains preference information for the plurality of SIP identities that are referred to therein.

34. A method for Session Initiation Protocol (SIP) based communications according to claim 31, further comprising:

providing an administration interface for the SIP-enabled device, wherein the administration interface receives a remotely configured SIP profile referring to a plurality of the SIP identities and subsequently stores received SIP profiles in the storage medium, the SIP user agent having registered a different SIP address with each registered SIP registrar.

35. A method for Session Initiation Protocol (SIP) based communications according to claim 33, further comprising:

providing a user interface for the SIP communications device, wherein the user interface displays a selectable representation of each stored SIP profile;

selecting one of the selectable representations;

receiving the contents of the selected SIP profile, which is represented by the selected representation, and attempting to maintain a plurality of simultaneous SIP registrations with the SIP registrars, which are specified in the registration information of the SIP identities that are referred to for simultaneous registration in the selected SIP profile.

36. A method for Session Initiation Protocol (SIP) based communications according to claim 33, further comprising:

providing a user interface for the SIP communications device, wherein the user interface displays a selectable representation of each stored SIP profile;

selecting one of the selectable representations;

receiving the contents of the selected SIP profile, which is represented by the selected representation;

creating a preferred order of registration, wherein the preferred order of registration identifies a most preferred SIP registrar and a next most preferred SIP registrar;
attempting to register with the most preferred SIP registrar; and
attempting to register with the next most preferred SIP registrar, if attempting to register with the most preferred SIP registrar is not successful.

37. A method for Session Initiation Protocol (SIP) based communications according to claim 33, further comprising:
providing a user interface for the SIP communications device, wherein the user interface displays a selectable representation of each stored SIP profile;
selecting one of the selectable representations;
receiving the contents of the selected SIP profile, which is represented by the selected representation;
creating a preferred order of registration, wherein the preferred order of registration identifies a most preferred SIP registrar and a next most preferred SIP registrar;
attempting to register with the most preferred SIP registrar; and
attempting to register with the next most preferred SIP registrar, if a loss of registration occurs with the most preferred SIP registrar.

38. A method for Session Initiation Protocol (SIP) based communications according to claim 35, further comprising:
displaying a message on the user interface if none of the registration attempts result in a successful SIP registration.

39. A method for Session Initiation Protocol (SIP) based communications according to claim 36, further comprising:
displaying a message on the user interface if none of the registration attempts result in a successful SIP registration.

40. A method for Session Initiation Protocol (SIP) based communications according to claim 32, further comprising:
providing a user interface for the SIP communications device, wherein the user interface displays a plurality of selectable line appearance representations, wherein each selectable line appearance representation corresponds to an active SIP-based session in which the SIP-enabled device is currently participating;
selecting one of the selectable line appearance representations;
sending session data in the active session that corresponds to the selected line appearance representation.

41. A method for Session Initiation Protocol (SIP) based communications according to claim 32, further comprising:
providing a user interface for the SIP communications device, wherein the user interface displays a plurality of selectable line appearance representations, wherein each selectable line appearance representation corresponds to an active SIP-based session in which the SIP-enabled device is currently participating, and wherein the user interface also displays a selectable function representation, which is associated with a session control function;
selecting the selectable function representation;
selecting one or more of the selectable line appearance representations;
applying the selected session control function, which is associated with the selected function representation, to the one or more selected SIP-based sessions, which correspond to the one or more selected line appearance representations.

42. A method for Session Initiation Protocol (SIP) based communications according to claim 41, wherein:
the session control function that is associated with the selectable function representation is a session holding function.

43. A method for Session Initiation Protocol (SIP) based communications according to claim 41, wherein:
the session control function that is associated with the selectable function representation is a session conferencing function.

44. A method for Session Initiation Protocol (SIP) based communications according to claim 36, wherein:
the preference information of at least one stored SIP profile is based on historical performance data.

45. A method for Session Initiation Protocol (SIP) based communications according to claim 37, wherein:
the preference information of at least one stored SIP profile is based on historical performance data.

46. A Session Initiation Protocol (SIP) enabled device according to claim 1, further comprising:
a user interface that displays a plurality of selectable SIP identity representations and one or more selectable registration function representations, wherein each selectable SIP identity representation corresponds to a SIP identity that is stored in the storage medium, and wherein each selectable registration function representation corresponds to a SIP registration function; and
wherein a selection of one of the plurality of selectable SIP identity representations and one of the one or more selectable registration function representations causes the SIP-enabled device to perform the SIP registration function, which corresponds to the selected registration function representation, with the SIP registrar, which is specified in the SIP identity that corresponds to the selected SIP identity representation.

47. A computer program product according to claim 16 wherein the non-transitory computer readable program code is further configured:
to control a user interface of the SIP-enabled device, wherein the user interface displays a plurality of selectable SIP identity representations and one or more selectable registration function representations, wherein each selectable SIP identity representation corresponds to a SIP identity that is stored in the storage medium, and wherein each selectable registration function representation corresponds to a SIP registration function; and
wherein a selection of one of the plurality of selectable SIP identity representations and one of the one or more selectable registration function representations, causes the SIP-enabled device to perform the SIP registration function, which corresponds to the selected registration function representation, with the SIP registrar, which is specified in the SIP identity that corresponds to the selected SIP identity representation.

48. A method for Session Initiation Protocol (SIP) based communications according to claim 31, further comprising:
providing a user interface for the SIP-enabled device, wherein the user interface displays a plurality of selectable SIP identity representations and one or more selectable registration function representations, wherein each selectable SIP identity representation corresponds to a SIP identity that is stored in the storage medium of the SIP-enabled device, and wherein each selectable registration function representation corresponds to a SIP registration function; selecting one of the plurality of selectable SIP identity representations;
selecting one of the one or more selectable registration function representations; and performing the SIP registration function, which corresponds to the selected registration function representation, with the SIP registrar, which is specified in the SIP identity that corresponds to the selected SIP identity representation.

* * * * *